United States Patent
Richard

[11] 3,729,849
[45] May 1, 1973

[54] ICE FISHING APPARATUS FOR SIGNALLING THE BITING OF A FISH

[76] Inventor: David D. Richard, 4944 Welcome Avenue North, Crystal, Minn. 55428

[22] Filed: Mar. 4, 1971

[21] Appl. No.: 120,812

[52] U.S. Cl. ................................................43/17
[51] Int. Cl. .........................................A01k 97/12
[58] Field of Search ...................................43/17, 16

[56] References Cited

UNITED STATES PATENTS

| | | | |
|---|---|---|---|
| 3,190,026 | 6/1965 | Roszak | 43/17 |
| 2,624,972 | 1/1953 | Burg | 43/17 |
| 2,803,912 | 8/1957 | Kellar | 43/16 |
| 2,008,555 | 7/1935 | Kovane | 43/16 |
| 3,187,456 | 6/1965 | Apitz | 43/17 |

*Primary Examiner*—Louis G. Mancene
*Assistant Examiner*—Daniel J. Leach
*Attorney*—Williamson, Palmatier & Bains, H. Dale Palmatier, Herman H. Bains and Malcolm L. Moore

[57] ABSTRACT

An ice fishing apparatus for signaling the biting of a fish, including an upright post with a pole pivotally mounted thereto and extending therefrom, the pole retained in an equilibrium position by a spring extending between post and pole. A fishing reel is mounted on the apparatus, and fishing line stored thereon passes along the pole and downward into an ice hole. The tugging of a biting fish causes the spring supported pole to oscillate about the equilibrium position along a path thereby visually signalling the biting of the fish. The reel may be positioned on the post in the path of the pivotally mounted pole so that a strong tug on the line causes the pole to swing toward and bear against the reel thereby retarding the playing out of fishing line by in creasing the drag on the line. When the equilibrium position of the pole is horizontal, the pole is substantially unaffected by wind forces acting thereon, assuring that the fisherman is not falsely signalled by pole oscillation generated by the wind.

1 Claim, 5 Drawing Figures

Patented May 1, 1973
3,729,849
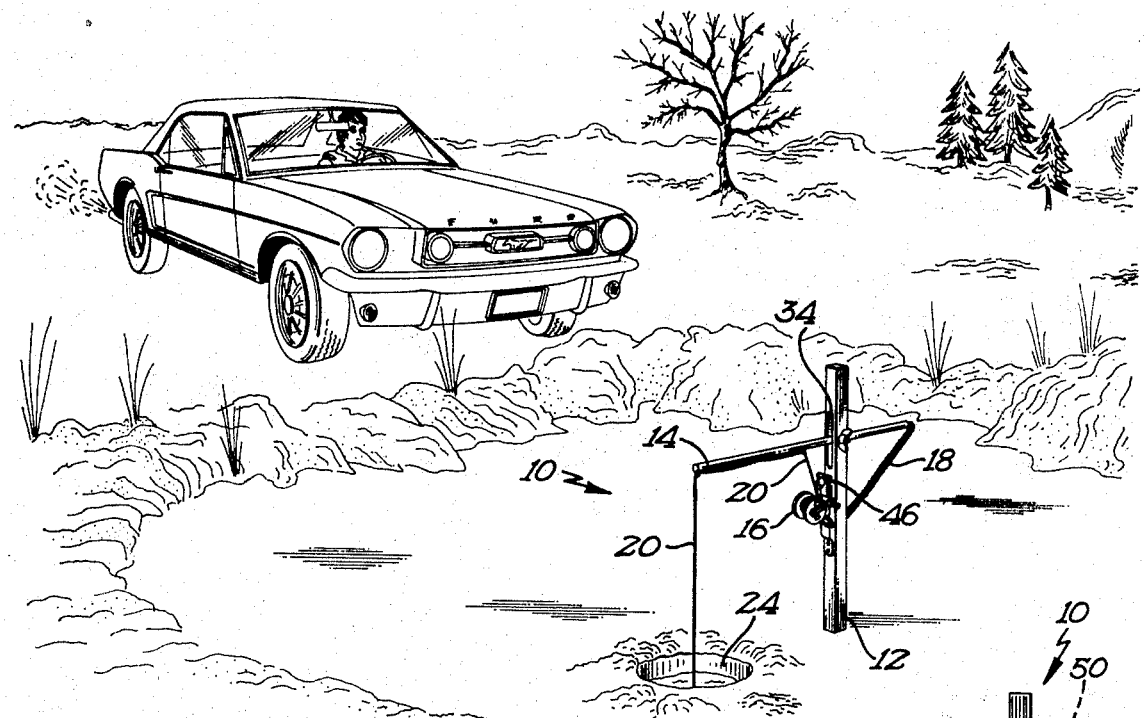
Fig 1
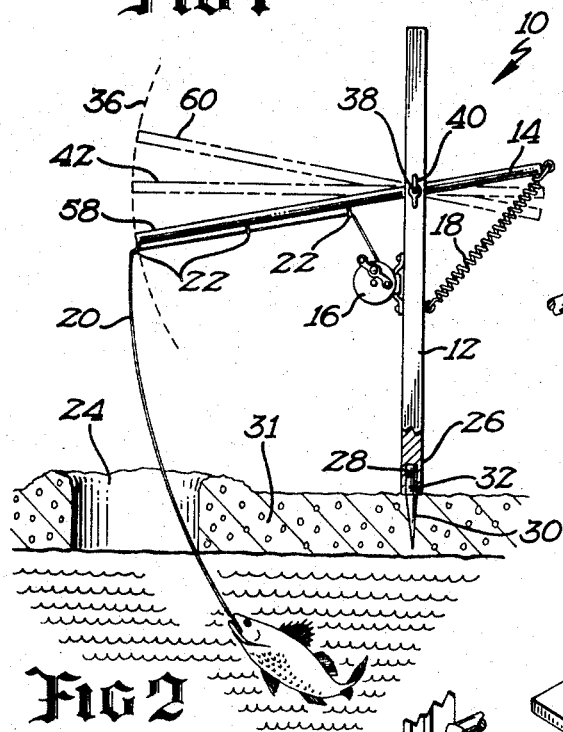
Fig 2
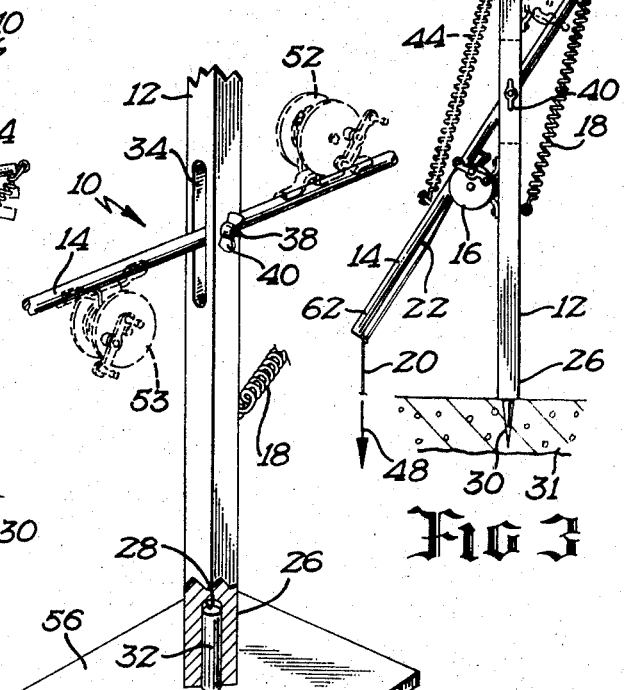
Fig 3
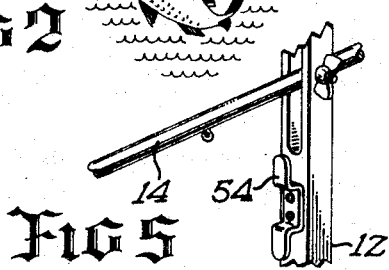
Fig 5
Fig 4
INVENTOR.
David D. Richard
BY
Williamson, Palmatier
& Bains ATTORNEYS

3,729,849

ICE FISHING APPARATUS FOR SIGNALLING THE BITING OF A FISH

The purpose of the foregoing abstract is to enable the U.S. Pat. Office and the public generally, and especially the scientists, engineers, or practitioners in the art who are not familiar with patent or legal terms of phraseology, to determine quickly from a cursory inspection the nature and essence of the technical disclosure of the application. The abstract is neither intended to define the invention of the application, which is measured by the claim, nor is it intended to be limiting as to the scope of the invention in any way.

BACKGROUND OF THE INVENTION

Frequently ice fishing is conducted during cold, bitter weather on open stretches of ice where little or no protection is available from often severe winter winds. To detect a nibble or strike on the fishing line it has been necessary for the fisherman to remain in close proximity to his pole and endure the existing weather conditions. It is an object of the present invention to provide an apparatus permitting the fisherman to retreat to a nearby position of shelter, such as a heated automobile, and from there observe his fishing apparatus with little risk that a biting fish will go unnoticed. The fishing apparatus should be sturdy, reliable, and capable of signalling the biting of a fish even when winds buffet the fishing apparatus.

SUMMARY OF THE INVENTION

The invention comprises an upright post to be supported by the ice of a lake or stream. A pole is pivotally mounted to the post and extends outwardly therefrom for swinging movement along a path. Guides are provided on the pole to lead fishing line from a fishing reel, along the pole, and thence downward to the ice fishing hole. The fishing reel may be positioned on the post in the path of the pivotally mounted pole so that the pole can swing toward and bear against the reel thereby retarding reel rotation and the playing out of line to a tugging fish. A spring extends between the post and the pole, supporting the extended pole in an equilibrium position and permitting the pole to oscillate about the equilibrium position when the pole is displaced therefrom due to the line being pulled by a biting fish, thereby visually signalling a watching fisherman in a nearby shelter. If the fish's tugging is excessive the pole swings along the path until it bears against the fishing reel thereby retarding the release of additional line during the short interval required for the fisherman to reach the apparatus and pull in the fish. If the pole is arranged to have a horizontal equilibrium position when no fish is on the line, the horizontally directed wind forces commonly present on open lakes cause no deflection or pole movement which would erroneously signal the fisherman.

This compact, lightweight, easily stored invention makes it possible for a fisherman to remain in a place of shelter, such as a heated automobile, while waiting for a fish to strike, thereby greatly diminishing the discomfort and privation associated with ice fishing.

BRIEF DESCRIPTION OF THE DRAWINGS

FIG. 1 is a pictorial view of the ice fishing apparatus invention in use on a frozen waterway.

FIG. 2 is a partial sectional side view of the invention, showing the pole being oscillated by a tugging fish.

FIG. 3 is a side elevational view of the invention of FIG. 2 showing the pole bearing against the reel and also indicating alternative reel and spring positions.

FIG. 4 is a partial pictorial view of the invention showing it mounted on a platform for use in an ice fishing house and also indicating alternative positions for the fishing reel.

FIG. 5 is a partial view of the invention showing an alternative reel structure useable therewith.

DESCRIPTION OF THE INVENTION

Referring now to FIG. 1, the ice fishing apparatus invention, shown generally at 10, has an upright post 12, a pole 14 pivotally mounted to the post, a reel 16, and a spring 18 between pole and post. The reel 16 is shown mounted on the post 12 and stores a supply of fishing line 20 which extends from the reel, along guides 22 on the pole and thence downward through the ice hole 24.

The post 12 is formed of wood, plastic or other rigid material. The base 26 of the post (FIG. 2) has a socket 28 to receive a mounting spike 30. When the post is to be mounted in an upright position on the ice of a waterway, the mounting spike 30 is driven into the ice and the socket 28 then inserted over the head 32 of the spike to provide the necessary support for the post 12.

The post 12 is shown with a longitudinal slot 34 therein through which pole 14 is passed and in which the pole is pivotally mounted for swinging movement along a path 36 (FIG. 2). In the shown structure the pole 14 is swingable along a horizontal axis centered on bolt 38 which is retained in a bore through post 12 by removeable wing nut 40 to provide the pivotal mounting. It should be understood that post 12 need not be slotted and that pole 14 can be pivotally mounted to the post in other ways known to the art and still obtain a comparable swinging movement.

The pole 14 is formed of a rigid material, inter alia wood or plastic, and is provided with guides 22 to lead the fishing line 20 to the end of the pole. It is helpful if the pole has a colorful appearance to improve its visibility against the white backdrop of winter; orange coloration has proven effective.

A spring 18 extends between post 12 and pole 14 and is of sufficient length to retain the pivoted pole 14 in an equilibrium position when no force is exerted on the fishing line by a tugging fish. It has been found helpful to have the pole's equilibrium position be a horizontal position; wind forces sweeping across the lake surface are ordinarily horizontally directed and hence do not cause a horizontal pole pivotally mounted on a horizontal axis to oscillate along the shown path 36. Preferably the spring 18 should be readily extensible so that even a small downward force on the fishing line results in a visually noticeable displacement of the pole from the equilibrium position (FIG. 2) so as to signal the biting of a fish. It should be understood that although in FIG. 1 an end of the spring 18 is shown attached to the post 12 at a position below the level of the pole 14, the end of spring 18 may be attached to the post above the level of the pole 14 so as to occupy alternative position 44 (FIG. 3).

The reel 16 may be rigidly attached to the post 12 as shown in FIGS. 2 and 3. Alternatively, the post may be provided with a releaseable mounting bracket 46 (FIG. 1) to permit a variety of different reels to be used with the invention. The reel 16 is positioned on the post in a location in the path of pole 14 so that when the pole is displaced downward by a force 48 of a tugging fish, the pole will contact and bear against reel 16 (FIG. 3) to retard the reel's rotation and the playing out of line to the tugging fish. It should be understood that the reel 16 may be located at alternative locations on the post 12 such as that indicated by dotted lines at 50 in FIG. 3 without adverse effects. Alternatively, the reel may be mounted on the pole 14 (FIG. 4) in position 52 or 53 to bear against the post 12 when the pole is displaced from an equilibrium position toward the post by a tugging fish thereby retarding rotation of the reel as described earlier herein. It should be understood that all such described arrangements for mounting a rotatable fishing reel are within the purview of the invention.

The invention disclosed herein operates effectively even if the shown rotatable fishing reel 16 (FIG. 1) is replaced by a bracket 54 (FIG. 5) on post or pole about which fishing line can be wound. It should be understood that the term "reel" as used herein encompasses such bracket structure.

The fishing apparatus invention can also be used in ice fishing houses or from docks. When such uses are contemplated, a platform 56 like that shown in FIG. 4 is used; a spike 32 protruding from the platform fits within the socket 28 of post 12 to retain the post in an upright position. The platform is placed on the dock or on the floor of the ice house near the ice hole.

In operation, a fisherman drives the mounting spike 30 (FIG. 2) securely into the ice 31 and than lowers the socket 28 of post 12 over the head 32 of the spike to retain the post in an upright position. Fishing line 20 is extended from reel 16 (FIG. 2) through the guides 22 of the pole, and then downward into ice hole 24, the line terminating at a baited hook. The pivotally mounted pole 14 is retained in an equilibrium position 42 by spring 18. While the fisherman waits for a fish to strike the bait, he can retreat to a sheltered position from which he can observe the apparatus 10, such as a heated car. It should be clearly understood, however, that the apparatus 10 is not intended to and does not set the hook in a striking fish; the invention is designed to signal the biting of the fish.

When a fish strikes the hook and tugs the line 20 the pole 14 is displaced from the equilibrium position to position 58 (FIG. 2); the resulting restoring force of the spring 18 then causes the pole to move upward to a position 60 where gravitational or fish tugging force again moves the pole downward. As a result the pole begins to oscillate about the equilibrium position 42 as indicated in FIG. 2.

When the pole is observed to oscillate about the equilibrium position, the fisherman returns to the fishing apparatus 10 to challenge the fish. If the fish pulls so hard as to lower the pole 14 to a position of maximum deflection 62 (FIG. 3) the pole 14 bears against reel 16 to retard its rotation, thereby reducing the rate at which line is played out to the fish. This gives the fisherman additional time in which to reach the apparatus 10 and retrieve the fish.

If the pole's equilibrium position is horizontal as shown in FIG. 1, the pole does not oscillate substantially in response to wind forces acting against it from any horizontal direction. Avoidance of wind generated oscillation is helpful because it eliminates pole movements which might be mistaken for those caused by a tugging fish.

When the fishing expedition is completed, the line 20 is reeled in and stored wholly on the fishing reel. The mounting spike 30 is extracted from the ice. The wing nut 40 is removed from bolt 38 and the bolt extracted from the post, permitting pole 14 to be separated from the post. The spring can be detached from the pole and the entire apparatus 10 can then be packed into a single compact bundle during transportation and storage.

While the preferred embodiments of the present invention have been described, it should be understood that various changes, adaptations and modifications may be made therein without departing from the spirit of the invention and the scope of the appended claim.

What is claimed is:

1. A fishing apparatus for signalling the biting of a fish comprising:
   an upright post;
   a pole pivotally mounted to the post and extending outwardly therefrom, the pole swingable along a path;
   a rotatable fishing reel mounted on the post to store a supply of fishing line, the reel mounted within the path of the pivotally mounted pole as the pole bears against and retards rotation of the reel when the pole is swung against the reel by a tugging fish;
   guide means on the pole for guiding the fishing line from the reel and along the pole; and
   a spring connected between the post and the pole, the spring supporting the pivotally mounted extended pole in a horizontal equilibrium position and permitting the pole to oscillate along the path about the equilibrium position when displaced from the equilibrium position by a tugging fish at one end of the line, the pole thereby visually signalling the biting of the fish.

* * * * *